US011755688B2

(12) United States Patent
Quinton et al.

(10) Patent No.: US 11,755,688 B2
(45) Date of Patent: Sep. 12, 2023

(54) APPARATUS AND METHOD FOR GENERATING TRAINING DATA FOR A MACHINE LEARNING SYSTEM

(71) Applicant: Singulos Research Inc., Burnaby (CA)

(72) Inventors: Bradley Quinton, Vancouver (CA); Trent McClements, Burnaby (CA); Michael Lee, North Vancouver (CA); Scott Chin, Vancouver (CA)

(73) Assignee: Singulos Research Inc., Burnaby (CA)

(*) Notice: Subject to any disclaimer, the term of this patent is extended or adjusted under 35 U.S.C. 154(b) by 107 days.

(21) Appl. No.: 17/557,515

(22) Filed: Dec. 21, 2021

(65) Prior Publication Data

US 2022/0318568 A1 Oct. 6, 2022

Related U.S. Application Data

(60) Provisional application No. 63/167,800, filed on Mar. 30, 2021.

(51) Int. Cl.
*G06N 3/00* (2023.01)
*G06F 18/214* (2023.01)
*G06T 19/00* (2011.01)
*G06N 3/088* (2023.01)
(Continued)

(52) U.S. Cl.
CPC .......... *G06F 18/2148* (2023.01); *G06F 18/24* (2023.01); *G06N 3/045* (2023.01); *G06N 3/088* (2013.01); *G06T 19/00* (2013.01)

(58) Field of Classification Search
None
See application file for complete search history.

(56) References Cited

U.S. PATENT DOCUMENTS

| 11,657,572 B2* | 5/2023 | Jian | G06V 20/64 |
| | | | 345/419 |
| 2004/0189691 A1* | 9/2004 | Jojic | G06F 16/7328 |
| | | | 715/838 |

(Continued)

*Primary Examiner* — Martin Mushambo
(74) *Attorney, Agent, or Firm* — BORDEN LADNER GERVAIS LLP; Todd Keeler (57) ABSTRACT

The present disclosure provides an apparatus and method for training a machine learning engine configured to determine whether an object in a two dimensional (2D) image is in-scope or out-of-scope relative to the one or more 3D objects that includes receiving a 3D model of each of the one or more 3D objects, for each 3D model receiving a set of specifications and thresholds for the 3D model, augmenting the specifications of the 3D model to generate a plurality of augmented 3D models, and generating auxiliary training data based on the plurality of augmented 3D models, and utilizing the auxiliary training data to train the machine learning engine. The present disclosure also provides an apparatus and method for training a machine learning engine that includes receiving sampling parameters related to a system of interest, sampling a generative model of a generative adversarial network (GAN) based on the sampling parameters to generate auxiliary input data, inputting the auxiliary input data into a discriminator model of the GAN to generate an auxiliary label associated with each of the auxiliary input data element, and utilizing the auxiliary input data and auxiliary labels as auxiliary training data to train the machine learning engine.

9 Claims, 7 Drawing Sheets

(51) Int. Cl.
  *G06F 18/24*   (2023.01)
  *G06N 3/045*   (2023.01)

(56) References Cited

U.S. PATENT DOCUMENTS

| | | | | |
|---|---|---|---|---|
| 2017/0092012 | A1* | 3/2017 | Palanivelu | G06T 19/20 |
| 2018/0211164 | A1* | 7/2018 | Bazrafkan | G06N 3/045 |
| 2019/0012581 | A1* | 1/2019 | Honkala | G06V 10/758 |
| 2019/0026958 | A1* | 1/2019 | Gausebeck | H04N 13/10 |
| 2019/0096135 | A1* | 3/2019 | Dal Mutto | G06F 18/24765 |
| 2019/0108396 | A1* | 4/2019 | Dal Mutto | G06F 18/24 |
| 2019/0122072 | A1* | 4/2019 | Cricrì | G06V 20/46 |
| 2019/0147333 | A1* | 5/2019 | Kallur Palli Kumar | G06N 3/08 706/25 |
| 2019/0188566 | A1* | 6/2019 | Schuster | G06N 3/08 |
| 2020/0110181 | A1* | 4/2020 | Lu | G05B 23/0243 |
| 2020/0117863 | A1* | 4/2020 | Ha | G06K 19/07771 |
| 2020/0211209 | A1* | 7/2020 | Liao | G06T 5/005 |
| 2020/0372291 | A1* | 11/2020 | Dey | G06T 19/00 |
| 2021/0019572 | A1* | 1/2021 | Munoz Delgado | G06N 3/084 |
| 2021/0097401 | A1* | 4/2021 | Ramalho | G06N 7/01 |
| 2021/0271591 | A1* | 9/2021 | Trost | G06N 3/047 |
| 2021/0272341 | A1* | 9/2021 | Swaminathan | G06V 40/10 |
| 2021/0304891 | A1* | 9/2021 | Kozloski | G16H 50/20 |
| 2021/0326661 | A1* | 10/2021 | Munoz Delgado | G06F 18/2113 |
| 2022/0027684 | A1* | 1/2022 | Sheu | G01S 7/4808 |
| 2022/0044070 | A1* | 2/2022 | Koh | G06N 3/08 |
| 2022/0122324 | A1* | 4/2022 | Jian | G06T 15/08 |
| 2022/0147876 | A1* | 5/2022 | Dalli | G06N 3/08 |
| 2022/0172050 | A1* | 6/2022 | Dalli | G06N 5/045 |
| 2022/0351378 | A1* | 11/2022 | Kamiyama | G06T 7/0012 |

\* cited by examiner

APPARATUS AND METHOD FOR GENERATING TRAINING DATA FOR A MACHINE LEARNING SYSTEM

CROSS REFERENCE TO RELATED APPLICATIONS

This application claims the benefit of priority of U.S. Provisional Patent Application No. 63/167,800 filed Mar. 30, 2021, the entirety of which is incorporated herein by reference.

FIELD

The present disclosure relates to machine learning systems, and more particularly to generating training data for machine learning systems.

BACKGROUND

Machine learning systems are systems that can be trained to process and analyze specific data sets to produce a decision or judgment. Machine learning systems are trained using a training process. A training process is a process in which, using various search and optimization processes, such as, for example, backpropagation, the parameters of the machine learning system are iteratively adjusted based the evaluation of a cost function. Parameters are the internal states of the machine learning system that are changed during the training process and recorded for use when the machine learning system is tested or used to generate predicted labels for never-before-seen input data in what may be referred to as a deployed scenario.

The cost function measures the accuracy of a given prediction versus a desired output of a machine learning system, referred to as a label. During the training process the cost function acts as a proxy to results of the prediction engine, which is the portion of the machine learning system that processes the output of the machine learning engine to predict the label in the sense that, in general, lowering the cost, should lead to more accurate predictions from the prediction engine.

There are many ways to implement a machine learning system, including using an artificial neural network, recurrent neural networks, convolutional neural networks, logistic regression, support vector machines, etc. These machine learning systems are used for a large variety of applications including image classification, object detection, dynamic object comprehension. Image classification is the classification problem in the case in which the input is image data and the system predicts to which class the image belongs. In practice, a system designed to perform image classification supports a finite set of classes. A class may represent a specific type of object, or a more abstract concept such as an out-of-scope class indicating that the image does not belong in any of the other classes. Dynamic object comprehension as used in the present disclosure refer to simultaneous, real-time, identification, localization and tracking of one or many objects of interest across one or many object classes, which may facilitate real-time interaction between physical and virtual worlds and unlocking next generation applications ranging from augmented reality/mixed reality and robotics to on-line advertising and retail experiences.

Machine learning systems may be used to discriminate between classes of input data by using training data to learn an approximation to the true input feature space class boundaries. Input feature space class boundary, as used herein, refers to the boundary or partition between classes in the input feature space of a system of interest. The goal of training a machine learning system is to identify the partitioning of the input feature space into N partitions, where N is the number of classes that the system is meant to be able classify into, such that all points in the input feature space that are within one partition are examples from the same class. True input feature space class boundaries, as used in the present disclosure, refer to the actual input feature space class boundary of a system of interest. Learned input feature space class boundaries are the class boundaries learned by a machine learning system and are an approximation to the true input feature space class boundaries.

Ideally, every point in the input feature space is represented in the training data so that the input feature space class boundaries are well defined. In practice this is infeasible and only a subset of the input feature space is sampled by the training data. For points not directly represented, the machine learning system must learn approximations based on the training data available. This approximation may result in error representing the true input feature space class boundaries.

The major challenge, then, is ensuring that the training data is sufficient to produce a high-quality approximation to the true input feature space class boundaries.

Improvements in generating training data are desirable.

BRIEF DESCRIPTION OF THE DRAWINGS

Embodiments of the present disclosure will now be described, by way of example only, with reference to the attached Figures.

DETAILED DESCRIPTION

In an example embodiment, the present disclosure provides methods for generating auxiliary training data that includes an increased number of training data elements near the True Input Feature Space Class Boundaries compared to training data collected by conventional means.

In an embodiment, the present disclosure provides a method for training a machine learning engine configured to determine whether an object in a two dimensional (2D) image is in-scope or out-of-scope relative to the one or more 3D objects that includes receiving a 3D model of each of the one or more 3D objects, for each 3D model receiving a set of specifications and thresholds for the 3D model, augmenting the specifications of the 3D model to generate a plurality of augmented 3D models, and generating auxiliary training data based on the plurality of augmented 3D models, and utilizing the auxiliary training data to train the machine learning engine.

In an example embodiment, the method further includes, for each 3D model, generating a plurality of 2D projections of the 3D object associated with the 3D model, the plurality of 2D projections comprising initial training inputs that are each associated with an in-scope label, the 2D projections and in-scope labels comprising initial training data, and utilizing the initial training data to train the machine learning engine.

In an example embodiment, generating auxiliary training data based on the plurality of augmented 3D models comprises, for each augmented 3D model determining whether the specifications of the augmented 3D model are within the thresholds, classifying any augmented 3D model that are determined not within the thresholds as out-of-scope, and classifying any augmented 3D models are determined to be within the thresholds as in-scope.

In an example embodiment, generating the auxiliary training data based on the plurality of augmented 3D models comprises, for each augmented 3D model generating a plurality of augmented 2D projections of the augmented 3D model, the plurality of augmented 2D projections comprising augmented training inputs that are each associated with an in-scope label when the augmented 3D model is classified as in-scope or an out-of-scope label when the augmented 3D model is classified as out-of-scope.

In another embodiment, the present disclosure provides a method for training a machine learning engine that includes receiving sampling parameters related to a system of interest, sampling a generative model of a generative adversarial network (GAN) based on the sampling parameters to generate auxiliary input data, inputting the auxiliary input data into a discriminator model of the GAN to generate an auxiliary label associated with each of the auxiliary input data element, and utilizing the auxiliary input data and auxiliary labels as auxiliary training data to train the machine learning engine.

In an example embodiment, the method further includes receiving initial training data, and utilizing the initial training data to train the generative model and the discriminator model of the GAN system.

In an example embodiment, the discriminator model is configured to output a metric based on the auxiliary input models, and generating auxiliary labels associated with the auxiliary input data includes inputting the auxiliary input data into the discriminator model to generate a metric associated with each of the auxiliary input data element, and comparing the metric to one or more thresholds to determine the auxiliary label.

In an example embodiment, the system of interest is one or more three dimensional (3D) objects, and the machine learning engine is configured to determine whether an object in a two dimensional (2D) image is in-scope or out-of-scope relative to the one or more 3D objects.

In an example embodiment, the auxiliary input data are 2D renderings of the 3D objects, and the auxiliary labels are either in-scope indicating that the 2D rendering corresponds to one of the one or more 3D objects or out-of-scope indicating that the 2D rendering does not correspond to one of the one or more 3D objects.

In an example embodiment, the method further includes utilizing the auxiliary training data to further train the generative model and the discriminator model of the GAN system.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Machine learning systems are capable of learning to predict labels based on training processes having training data comprising inputs and associated labels. Subsequent testing processes may be used to validate the efficacy of the training process before deploying the machine learning system. In a deployed state, the machine learning system predicts a label for a given input on the basis of the configuration conditioned by the training process.

Generally, machine learning systems include a machine learning engine and a prediction engine. Other configurations are possible. The machine learning engine also includes parameters for conditioning calculations internal to the machine learning engine, including conditioning combinations of the calculations, including the combination which results in the machine learning engine output of the system. A neural network for example, can be implemented as a machine learning engine, where calculations internal to the neural network may be viewed as feature detectors, and the output of the feature detectors are typically referred to as activations. More generally however, calculations internal to a machine learning engine may be any type of internal calculation natural to the particular type of machine learning engine. For the sake of simplicity, regardless of the type of machine learning engine, all results of internal calculations will be referred to herein as activations.

Once training is complete, the parameter values are fixed. The fixed parameter values along with the fixed computational relationships of the machine learning engine and the prediction engine define the processing capabilities of the machine learning system and can be used to predict a label for a given data input. For example, the machine learning engine provides an output for a given input to a prediction engine for use in predicting a label associated with the given input. In this regard, the training process can be thought of as the process of finding a set of parameters for a given machine learning system that achieves a desired prediction goal for the system.

Conventionally, training data comprises a plurality of training elements, each training element having an input data and an associated label or desired label. Examples of labels include numeric or symbolic values. For example, the label may be a "one-hot" encoded vector with a length equal to the number of valid labels, with each position in the vector being used to represent each different label such that a value of '1' in the position corresponding to a specific label and values of '0' in all other locations represents another specific label. Many other label definitions are possible.

During the training process a cost function evaluates outputs provided by the machine learning engine against the corresponding desired label from the training data. Typically, the cost function is applied directly to the outputs of the machine learning engine, independent of a prediction engine. Examples of cost functions include, for example, binary cross entropy, categorical cross entropy, and r-squared. Further, a custom-designed cost function for a specific scenario may also be used. The cost function acts as a proxy for results generated by the prediction engine, in the sense that lowering the cost should lead, in general, to more accurate predictions from the prediction engine. However, this may not always be strictly true, and it is possible that lowering the cost according to the cost function does not improve the accuracy of the predicted labels. The cost function results, which may be referred to as the costs, are used to guide the update of the parameter values which condition the behaviour of the machine learning engine with the goal of finding a set of parameter values which optimizes or lowers the cost. This can be done with a number of search and optimization methods including, for example, gradient descent and backpropagation. In general, the training process is the process of finding a set of parameters for a given machine learning system that achieve the prediction goal of the system. The training process proceeds iteratively, updating the parameter values and evaluating the cost function until achieving a training cost or prediction goal of the system, achieving a maximum number of iterations, or achieving a desired condition or constraint.

Once the training process is complete, the cost function is replaced with a prediction engine applied to the output of the machine learning engine, to map machine learning engine outputs to label predictions. Once the prediction engine is implemented, the machine learning system may undergo testing with a testing data set to evaluate the performance of the trained machine learning engine, or may be deployed to make predictions on given input data. Many prediction engine implementations are possible. For example, in the case where the output is a vector, the prediction engine may consider all the vector locations and then select the label corresponding to the location of the element with the largest value in the vector.

Figure 1:
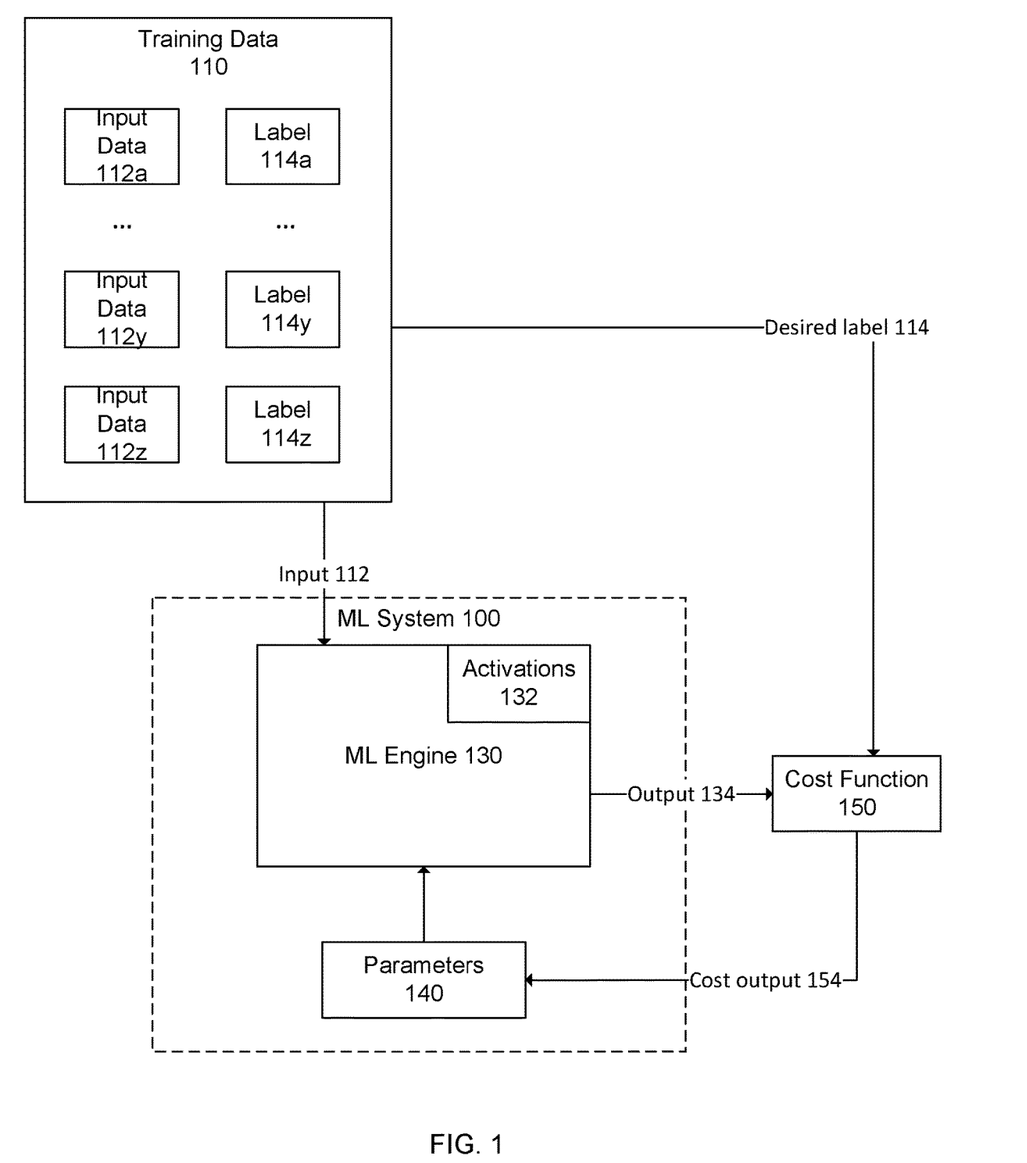
FIG. 1 illustrates a training process for a conventional machine learning system.
Figure 2:
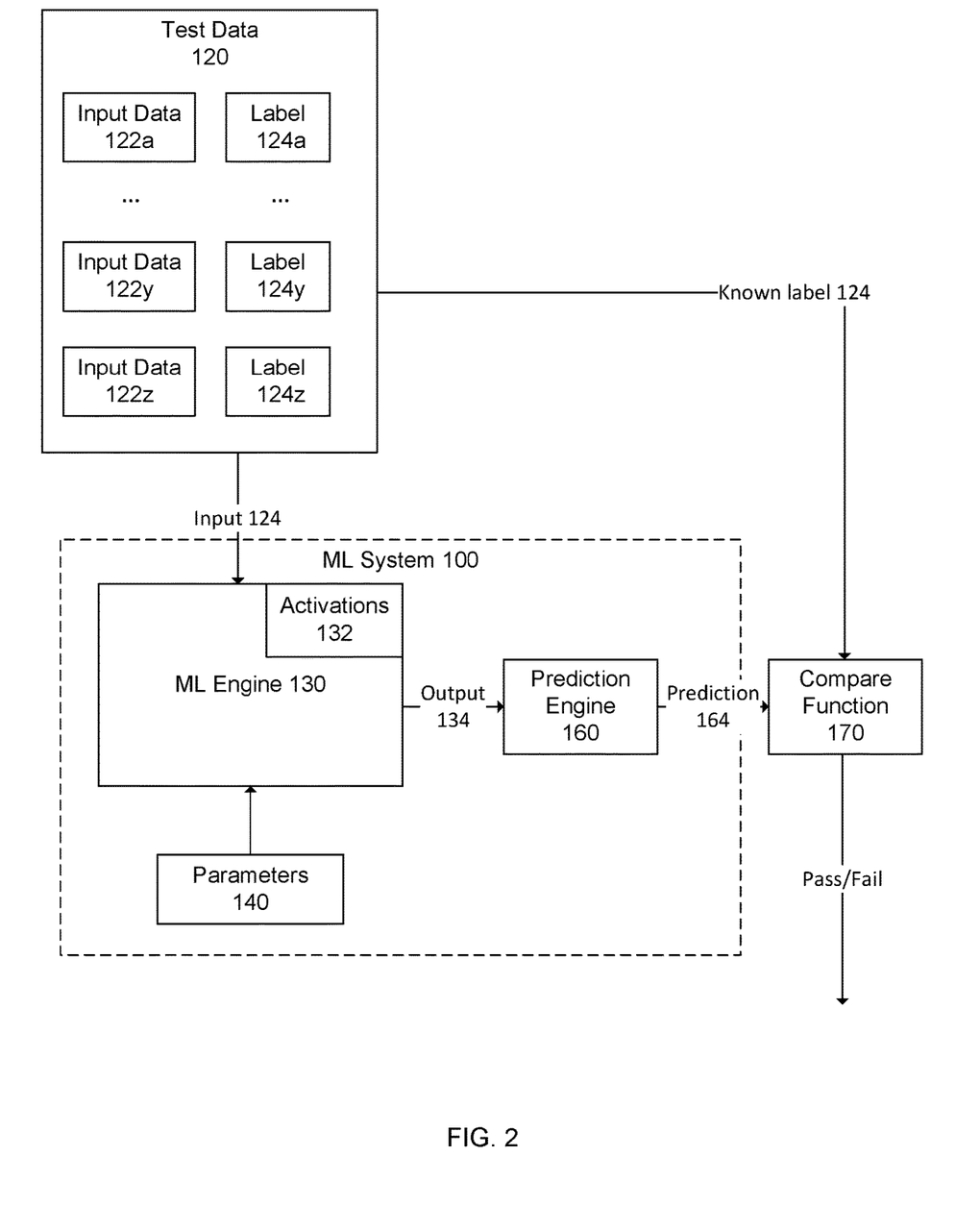
FIG. 2 illustrates a testing process for a conventional machine learning system trained in accordance with the training process of FIG. 1.
Figure 3:
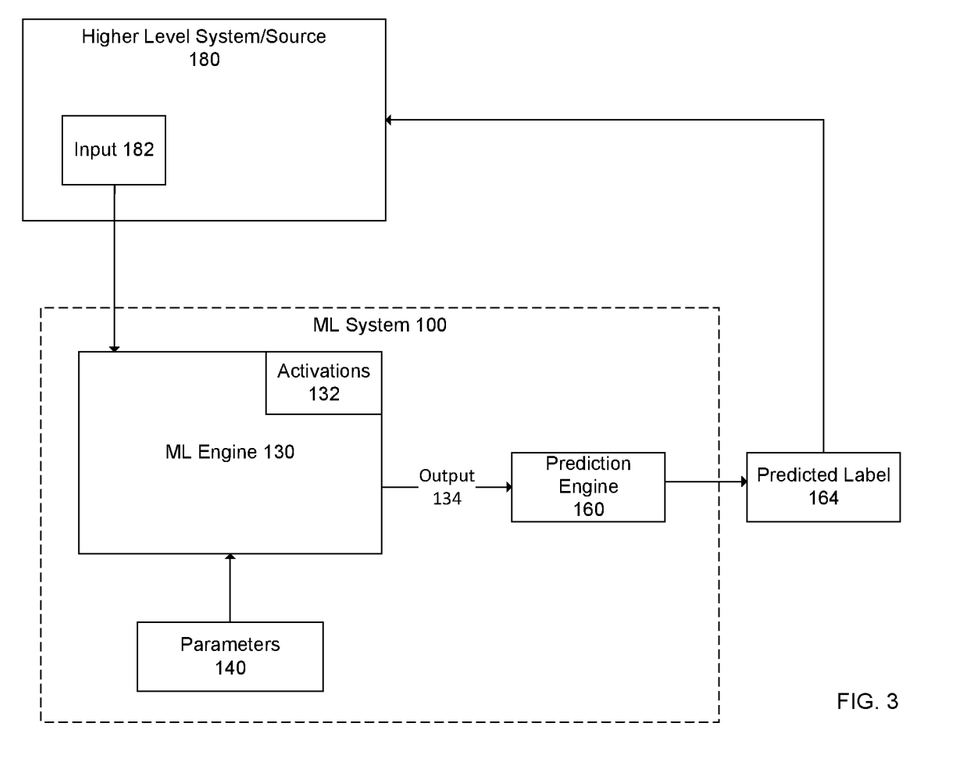
FIG. 3 illustrates a deployed machine learning system trained in accordance with the training process of FIG. 1 and optionally tested in accordance with the testing process of FIG. 2.

FIGS. 1-3 illustrate example processes respectively for training, testing, and deploying machine learning systems. FIG. 1 illustrates a training process for a previous machine learning system 100 which trains on a set of training data 110. The training data 110 consists of a plurality of training elements, namely a plurality of input data $112a, \ldots, 112y, 112z$ paired with a corresponding plurality of labels $114a, \ldots, 114y, 114z$. The machine learning system 100 includes a machine learning engine 130 having an associated set of activations 132 and associated set of parameters 140. During the training process, the machine learning engine 130 receives an input 112 corresponding to one of the plurality of input data $112a, \ldots, 112y, 112z$. For each input 112 received, the machine learning engine 130 generates an output 134 as a function of the parameters 140. The machine learning engine 130 provides the output 134 to a cost function 150 for comparison with a label 114 of the plurality of labels $114a, \ldots, 114y, 114z$ that pairs with the corresponding input 112. Based on the comparison, the cost function 150 generates a cost output 154 for use in tuning the parameters 140. This training process repeats until achieving a desired training goal. The final parameters and the computational relationship (architecture) of the machine learning engine can be stored and represent the trained machine learning engine 130.

FIG. 2 illustrates a testing process for a previous machine learning system 100 having a machine learning engine 130 trained in accordance with FIG. 1 and further including a prediction engine 160. The testing process can be applied to evaluate the trained machine learning engine 130 and parameters 140 using a set of test data 120 having a plurality of test elements, namely a plurality of test input data $122a, \ldots, 122y, 122z$ paired with a corresponding plurality of known correct labels $124a, \ldots, 124y, 124z$. During the testing process, the machine learning engine 130 receives an input 122 corresponding to one of the plurality of test input data $122a, \ldots, 122y, 122z$. For each input 122 received, the machine learning engine 130 generates an output 134 as a function of the trained parameters 140. The machine learning engine 130 provides the output 134 to the prediction engine 160 for generating a predicted label 164 which is provided to a comparison function 170 for comparison against a known label 124 representing a known correct label of the plurality of known correct labels $124a, \ldots, 124y, 124z$ that pairs with the corresponding input 122. If the predicted label 164 and the known label 124 do not match, then an error is considered to have occurred. The testing process continues in order to analyze any errors and determine whether the machine learning system 100 has achieved a desired goal.

FIG. 3 illustrates a deployment scenario for a previous machine learning system 100 having a machine learning engine 130 trained in accordance with FIG. 1 and optionally tested in accordance with the process of FIG. 2. In the deployment scenario, the trained machine learning engine 130 receives an input 182 from an external source 180, such as a higher level system, sensor, or data file. The machine learning engine 130 applies the parameters 140 to the input 182 to generate an output 134 which inputs to the prediction engine 160 for generating a predicted label 164. In the deployed scenario, there is no way to known whether the predicted label is correct or not.

One example of a deployed scenario is in a mixed reality system. Mixed reality is any interactive experience where the user can interact, in real-time, with real-world objects and virtual-objects, and the real and virtual objects may also interact with each other. A system that implements mixed reality, a mixed reality system, needs to interpret and understand the physical environment in which it operates. A common way that mixed reality systems facilitate this is to include one or more sensors such as, but not limited to, image sensors which produce image data. Mixed reality systems may use machine learning systems to interpret the sensor data to understand the physical objects in the environment. In such an implementation, the input to the machine learning system may be the sensor data, and the output may be a set of predictions for the location of objects of interest and/or the kind of the objects.

The conventional approach to training data collection is to arbitrarily collect as many examples as possible without considering whether sufficient representation along the true input feature space class boundaries is included within the training data. This approach may be inefficient and inadequate to train a machine learning system to identify the key features that delineate an object that is near the true input feature space class boundary.

The input feature space represents all possible input data from all possible classes. It is currently infeasible to build a single machine learning system that can understand all possible classes.

The present disclosure provides methods and apparatuses for identification, and targeted generation, of training data along the true input feature space class boundaries which may be utilized to better train machine learning systems to delineate objects that lie near the true input feature space class boundary compared to machine learning systems trained with training data collected by conventional methods. Specifically, this disclosure presents methods and apparatuses that describe targeted approaches to identifying the key features that delineate an object from being in-scope, which is the state of being part of a set of known classes for a given classification task, or out-of-scope, which is the state of not belonging to any of the target classes of the classification task and is the opposite of the in-scope state. The specification of these key features is then used to guide training data collection and generation of additional training data, referred to in this disclosure as auxiliary training data, near the true input feature space class boundaries.

In an aspect, the machine learning systems and methods disclosed herein may have application in a variety of fields, including for object recognition and identification, as may be particularly suited for mixed-reality applications where ambiguous data arising from mixed reality system sensors can be better identified and mitigated to provide a better overall user experience.

The benefits of the presently disclosed methods and apparatuses for generating training data near the true input feature space class boundaries are threefold. First, disclosed methods and apparatuses facilitate reduced error between the learned and true input feature space class boundaries during the training process compared to conventional approaches. This reduction in error improves the quality of the machine learning systems prediction. This reduction in error also mitigates adversarial methods which exploit this error to attack and compromise machine learning systems. Second, the disclosed methods and apparatuses improve training efficiency by reducing the total number of required training examples by collecting higher-quality examples, which include examples near the true input feature space class boundaries. And third, the disclosed methods and apparatuses facilitate developing targeted perception agents.

Targeted perception agents refers to a machine learning system module that may be deployed in parallel to other machine learning system modules, i.e., other targeted perception agents, owning to its ability to mark unknown objects as out-of-scope class. The targeted perception agents may be independent trained to focus on a specific perception task, and may be stored in the cloud, facilitating a large number of targeted perception agents to be available for use. In a dynamic object comprehension context, as input is received, a controller selects the set of targeted perception agents that may be necessary to accomplish the dynamic object comprehension goals. This selection may utilize a variety of information that is received from the environment, the users of the system, or results of other targeted perception agents. By specifying the bounding of the targeted features, enables training the targeted perception agents with reduced error between the learned and true input feature space class boundaries, which facilitates each targeted perception agent being better able to know whether a particular input is within any classes that it is trained to identify and, more importantly, whether the input is not within any of the classes that it is trained to identify, which indicates that another targeted perception agent should be used.

In one embodiment, training data that includes examples near the true input feature space class boundaries is generated by first collecting initial training data through conventional means, then performing augmentation on the training data to produce auxiliary training data elements. The augmentation process may be performed by conventional data augmentation techniques, which are processes that modify copies of already collected input data. For example, for each input data element included in the training data, the augmentation process may generate multiple copies where each copy is translated spatially by some unique amount to generate auxiliary input data. In other examples, other transforms, besides translation may be used to generate auxiliary input data such as, for example, rotation, zoom, different background, random noise injection, mirroring, color adjustment. The augmentation of the examples in the training data may be automated, such that they are performed by an augmentation engine configured to perform the previously described augmentation process. Alternatively, the augmentation process may be performed by a person who modifies the data.

The labels for the auxiliary input data elements are generated as in-scope or out-of-scope, and may be referred to as auxiliary labels. Such generation may be performed by a person who evaluates the additional training data elements and determines if the elements are in-scope or out-of-scope. The auxiliary input data and the generated auxiliary labels together form auxiliary training data.

In other embodiments, the initial training data, collected by conventional means is utilized to train a machine learning system that then generates the auxiliary input data, and in some embodiments the auxiliary labels for the auxiliary input data.

In an example, adversarial techniques are applied to the trained machine learning classification system to produce adversarial examples. Adversarial techniques are techniques that use input data that would be correctly classified by a trained machine learning system and modifies them to generate adversarial examples so that the machine learning system no longer classifies the adversarial example correctly. A concurrent objective of adversarial techniques is to make the differences between the original and modified data undetectable by a human inspector. Adversarial example data generation modifies input data by translating the data from its location in the input feature space, to another nearby location across a learned input feature space class boundary to generate auxiliary input data. These adversarial techniques may utilize the approximation error between the learned and true input feature space class boundaries to ensure that the adversarial example data is located across the input feature space class boundary.

The auxiliary labels are generated for the auxiliary input generated utilizing the adversarial technique. The auxiliary labels may be in-scope or out-of-scope. In the case of a system of interest that comprises one or more 3D objects, an in-scope auxiliary label will be generated when the corresponding auxiliary input data element, which for a system comprising one or more 3D objects may be a 2D image, is determined to include at least one of the one or more 3D objects, and an out-of-scope auxiliary label is generated when the auxiliary input data element is determined not to include at least one of the one or more 3D objects.

Generation of the auxiliary labels may be performed by a person who evaluates the auxiliary input data elements and determines if the auxiliary input data elements are in-scope or out-of-scope. Alternatively, auxiliary labels may be generated by a trained machine learning system. The auxiliary training data elements and the labels together form auxiliary training data. The machine learning system may be re-trained using the auxiliary training data. In embodiments, the new iteration of training may start with the learned parameters from the previous iteration. This process can be repeated for an arbitrary number of iterations. In each iteration, the generated adversarial examples will be closer to the true input feature space class boundary. The result is that after training with the added adversarial examples, the learned input feature space class boundary moves closer to the true input feature space class boundary.

In further example, a generative model trained utilizing the initial training data may be utilized to generate auxiliary input data. Generative models are a class of machine learning systems that, once trained, may be configured to learn to produce new instances of input data. More specifically, given a set of input data, a generative model learns the statistical properties of the features in the input data such that it can produce a new piece of data that may have similar statistical properties to the input data. Generative models output points from the input feature space based on a probability distribution learned from training data utilized to train the model. By training a generative model with in-scope training data collected, for example, by conventional methods, a generative model can be configured to sample parts of the input feature space that belong to the in-scope partition with high probability. These samples parts may be utilized as auxiliary input data. Specific examples of suitable generative models include, for example, variational auto encoders, Generative Adversarial Networks (GAN), and auto regressive models.

Auxiliary labels may be generated for the auxiliary input data elements generated by the generative model, with the auxiliary input data elements and the associated auxiliary labels forming auxiliary training data. In one example, the generation of auxiliary labels may be performed by a person who evaluates the auxiliary training data elements and determines if the auxiliary input data elements are in-scope or out-of-scope.

Alternatively, the auxiliary labels may be generated by a trained machine learning system. For example, the generative model is part of a GAN that includes a discriminator model that is also trained utilizing the input training data. In this example, the discriminator model may be utilized to generate the auxiliary labels for the auxiliary input data generated by the generative model. A discriminator model is a model in a GAN that may be trained to make a binary prediction regarding whether inputted data is real or fake. A prediction of real for a given input data element generates an in-scope label, and a prediction of fake for a given input data element generates an out-of-scope label.

In another example, the discriminator model of the GAN that includes the generation model may be replaced with, or configured as, a critical model that is configured to produce a likelihood score, which may be referred to herein as a metric, rather than an binary output. A critic model is a model used in a GAN that is trained to produce an unbounded continuous likelihood score that is interpreted as the likelihood that an input is real or fake. This unbounded continuous likelihood score, or metric, is a metric of how real or fake the input data is determined to be. In this example, the auxiliary input data generated by the generative model is input into the critic model and the metric produced by a critic model may be interpreted as a metric of likelihood for the image being in-scope or out-of-scope. The metric may be compared to a threshold such that, for example, determining that the metric lies on one side of the threshold results in an in-scope auxiliary label and determining that the metric lies on the other side of the threshold results in an out-of-scope auxiliary label.

Figure 4:
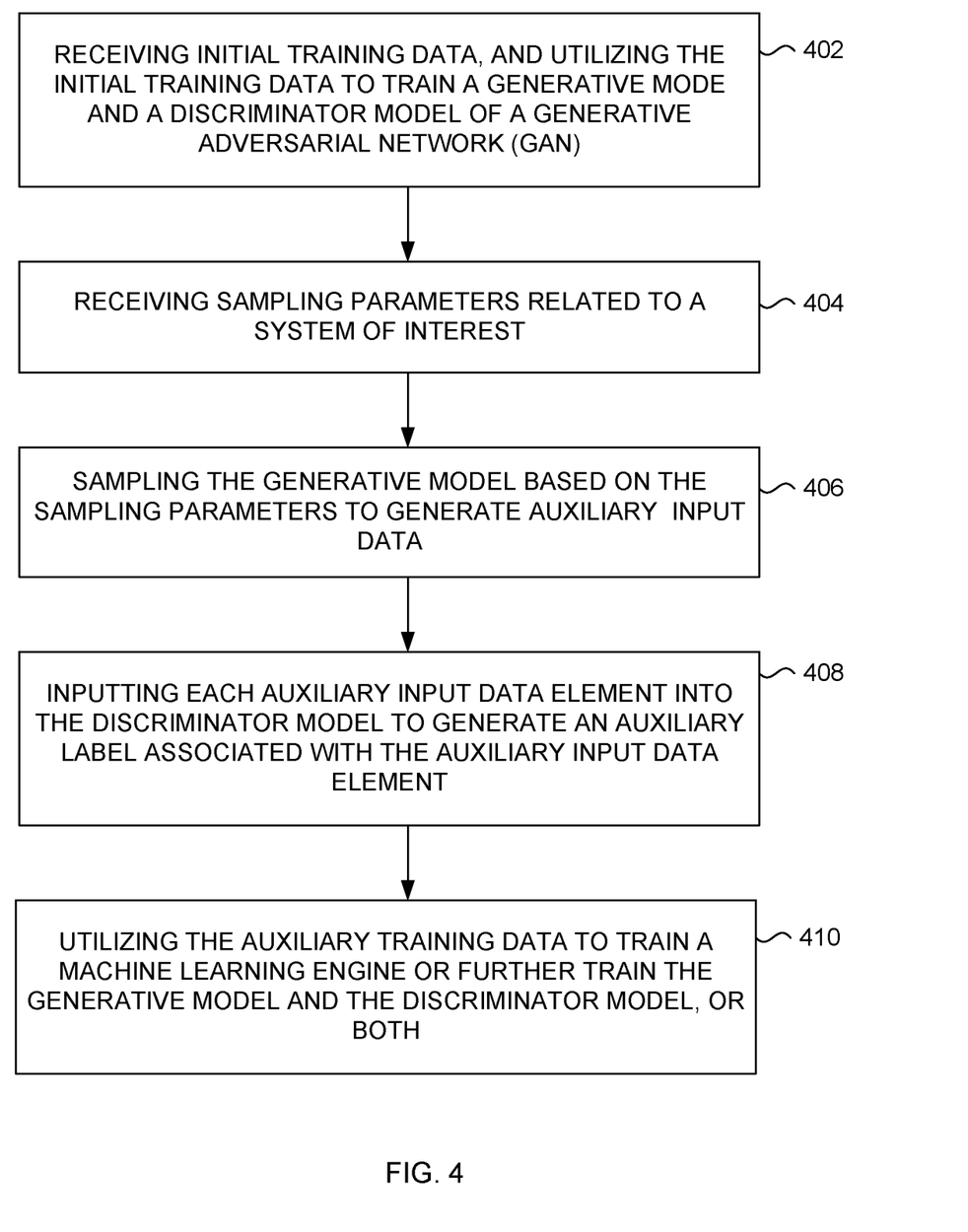
FIG. 4 is a flow chart illustrating an example method for generating auxiliary training data according to an embodiment of the present disclosure.

Referring to FIG. 4, a flow chart illustrating a method for generating auxiliary training data utilizing a generative model and a discriminator model of a GAN is shown.

At 402, initial training data is received and utilized to train the generative model and the discriminator model of the GAN. The training data may be collected utilizing conventional methods.

At 404, sampling parameters related to a system of interest are received. The sampling parameters that are received depend on what the system of interest is. In an example, the system of interest may be one or more three-dimensional (3D) objects, and the desired machine learning system that the auxiliary data is being generated for may be a system that identifies 3D objects in sensor data, such as images captured by a camera. However, in general, the system of interest may be any system that is capable of being described or defined by a set of parameters, or rules. The system of interest may include, for example, non-spatial systems such as languages in the case of a machine learning systems that are configured for speech or language recognition. Further these systems may include light detecting and ranging (LI DAR) and radio detection and ranging (RA-DAR) systems used to detect physical characteristics of the 3D world.

In the case of a system of interest comprised of one or more 3D objects, the initial training data may be comprised of 2D images of the one or more 3D objects. The sampling parameters may include, for example, specifications of the 3D objects, color, texture, reflectivity, and lighting arrangements.

At 406, the trained generative model is sampled based on the sampling parameters to generate auxiliary input data. In the case in which the system of interest is one or more 3D objects, the generated auxiliary input data elements may be images of objects. The trained generative model may be configured to sample regions of the input feature space that belong to the in-Scope partition with an arbitrary probability as opposed to regions with a high-probability. Sampling regions with decreasing probability may be performed to generate auxiliary input data that are closer to the boundary between in-scope class and out-of-scope class. In another example, the cost function for training the generative model is configured so that the resulting model samples the input feature space near the in-scope/out-of-scope partition boundary.

At 408, the auxiliary input data is inputted into the discriminator model to generate an auxiliary label associated with each of the auxiliary input data elements. In the case of a system of interest that comprises one or more 3D objects, an in-scope auxiliary label will be generated when the corresponding auxiliary input data element, which for a system comprising one or more 3D objects may be a 2D image, is determined by the discriminator model to include at least one of the one or more 3D objects, and an out-of-scope auxiliary label is generated when the auxiliary input data element is determined by the discriminator model not to include any of the one or more 3D objects. The auxiliary input data and the corresponding auxiliary labels form auxiliary training data.

In an example, the discriminator model is configured to generate a binary output for each auxiliary input data element as in-scope or out-of-scope, and these binary outputs form the auxiliary labels.

In other examples, the discriminator model of the GAN is configured to produce a likelihood score, which may be referred to herein as a metric, rather than a binary output. In this example, the discriminator model is configured to act as what may typically be referred to as a critic model. Thus, the metric produced by a critic model in response to inputting the auxiliary input data can be interpreted as a metric of likelihood for the image being in-scope or out-of-scope.

In the example in which the system of interest is one or more 3D objects, the set of images produced by the generator model and forming the auxiliary input data is input into the critic model to produce a set of likelihood scores, or metrics. A pre-determined threshold may be set such that likelihood scores on one side of the threshold are interpreted as in-scope, and results in an in-scope auxiliary label being generated, and likelihood scores on the other side of the threshold are interpreted as out-of-scope, and result in an out-of-scope auxiliary label. The in-scope and out-of-scope interpretations become the generated in-scope and out-of-scope auxiliary labels.

At 410, the auxiliary training data, comprising the auxiliary input data and the corresponding auxiliary labels, are utilized to train a machine learning system, or to further train the generative model and the discriminator model of the GAN, or both training the machine learning system and further training the generative and discriminator models of the GAN. Training the machine learning system may include utilizing the initial training data together with the auxiliary training data for training the machine learning system. The training process utilizing the auxiliary training data may be performed similarly to the training process described above with reference to FIG. 1.

Figure 5:
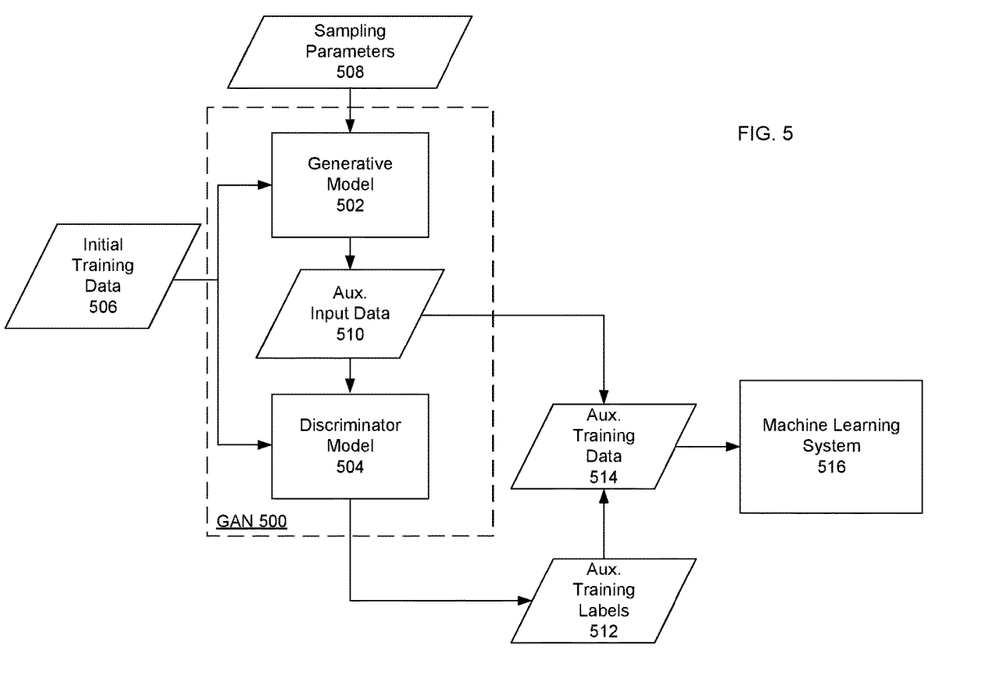
FIG. 5 is a schematic representation of an example generative adversarial network for generating auxiliary training data according to the method shown in FIG. 4.

FIG. 5 is a schematic diagram of a GAN 500 that may be utilized for performing the method illustrated by the flow chart shown in FIG. 4. The GAN 500 includes generative model 502 and discriminator model 504. As disclosed previously, the discriminator model may be configured to output a binary prediction of either real or fake, or an unbounded continuous likelihood score, or metric, in response to inputted data.

Initial training data 506 is received and input into the GAN 500 and utilized to train the generative model 502 and the discriminator model 504, as described previously with reference to 402 of FIG. 4. Sampling parameters 508 are also received and input into the generative model 502, as describe previously with reference to 404 of FIG. 4. Utilizing the sampling parameters 508, the generative model 502 is sampled the generate the auxiliary input data 510, as described previously with reference to 406 of FIG. 4. The auxiliary input data 510 is input into the trained discriminatory model 504 to generate the auxiliary labels 512, as described previously with reference to 408 of FIG. 4. The auxiliary input data 510 and the auxiliary labels 512 form the auxiliary training data 514. The auxiliary training data 514 is then input into a machine learning system 516 and utilized the train the machine learning system as described previously with reference to 410 of FIG. 4. In addition to utilizing the auxiliary training data 514 to train the machine learning system 516, the auxiliary training data 514 may optionally be input back into the GAN 500 and utilized to further train the generative model 502 and the discriminator model 504.

In another embodiment, rather than utilizing a trained GAN to generate auxiliary training data, one or more object source space specifications is used to define each class of a system of interest. An object source space specification is a specification of an object in the object source space, such as a method, representation, or encoding of an object in object source space. Object source space is the original space from which input data is derived. Consider, for example, photographic images taken by a digital camera. The source of this image data is in the real world. The images are projections of the 3D world onto a 2D sensor whose response is then encoded into the input feature space. In this scenario, the 3D world is the object source space. In this example, the object source space specification is a 3D specification. The 3D specification might be, for example, the set of outputs, such as 3D models defining shapes and/or textures, that may be created by, for example, conventional 3D modeling software or Computer-Aided Design (CAD) software. In the example in which the system of interest is one or more 3D objects, the object source space specifications are 3D models of the one or more 3D objects. In this embodiment, a projection engine is utilized to project the object source space specification into the input feature space to generate auxiliary input data. A projection engine may be a system that projects an object from the object source space to some target format. For example, if the object source space is the 3D world and the target format is image data encoded in the PNG file format, the projection engine could be a 3D rendering engine.

Figure 6:
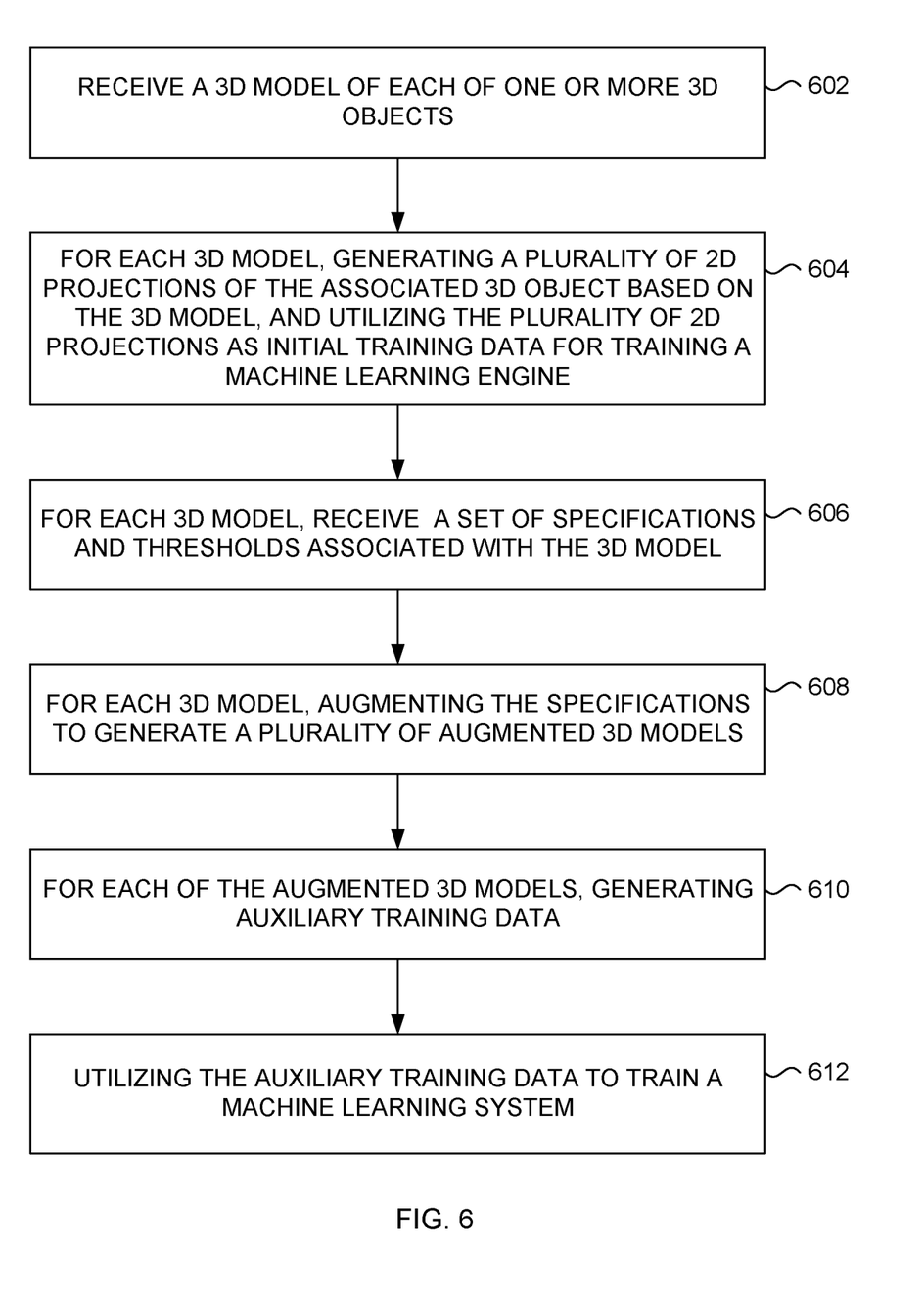
FIG. 6 is a flow chart illustrating an example method for generating auxiliary training data according to an embodiment of the present disclosure.

Referring to FIG. 6, a flow chart is shown that illustrates an example method for generating auxiliary training data based on generating projections from a one or more object source space specifications for a system of interest that comprises one or more 3D objects. In this example the object source space specifications are 3D models. Although the example method described with reference to FIG. 6 relates to 3D objects defined by 3D models, the method may be generalized to other systems of interest that are defined by other object source space specifications other than 3D objects defined by 3D models.

At 602, a 3D model for each of the one or more 3D objects forming the system of interest is received. The 3D models may be any suitable 3D model that defines the shape and/or texture of a 3D object, and may be created in any suitable way such as, for example, using conventional 3D modeling software or CAD software.

Optionally at 604, for each of the 3D models received at 602, a plurality of two-dimension (2D) projections are generated of the 3D object associated with the 3D model to generate initial training data. These 2D projections form initial training data which may be utilized to train a machine learning system. The projections may be generated by a projection engine as described previously. The projection engine projects the 3D models into the input feature space to generate the initial input data. Because the 3D model is related to a 3D object of interest, each projection generated based on the 3D model is necessary in-scope and therefore the initial input data generated from the 3D model is associated with an in-scope initial label. The initial input data and the initial labels form the initial training data.

The projection engine may be configured to generate the projections based on a set of projection parameters. Projection parameters are a set of parameters utilized to configure the projection engine to generate different projections based on the 3D model. For example, for a projection engine that is a 3D rendering engine, the set of projection parameters may include various spatial parameters such as, for example, rotation of the source object, its distance to the camera, various scene configurations such as light-source location and background.

At 606, a set of specifications and thresholds associated with each of the 3D models are received. The set of specifications include, for example, targeted features of the 3D model, each targeted feature having an associated threshold. Targeted features are features that, when removed or deformed beyond the threshold, result in the 3D model no longer belonging to a class, and therefore becoming out-of-scope. The specifications and the threshold may be based on, for example, manufacturing tolerances for the 3D object that the specifications and thresholds relate to. In an example, the specification and thresholds received at 606 may be created by a person who identifies targeted features that, when deformed beyond some threshold, make the specification no longer be a correct representation of the object within the class. In other examples, the specifications and thresholds may be generated by a trained machine learning system, such as, for example, a generative model and a discriminator model of a GAN that is configured and trained to identifies targeted features that, when deformed beyond some threshold, make the specification no longer be a correct representation of the object within the class.

At 608, for each 3D model and set of specifications, the specifications are augmented to generate a plurality of augmented 3D models. The specifications may be augmented by a specification augmentation engine, which may be any suitable system configured to generate derivative 3D models by removing or deforming, or both removing and deforming, one or more of the targeted features. Augmented 3D models in which the targeted features are deformed within the associated threshold are considered to be in-scope augmented 3D models. Augmented 3D models for which targeted features are deformed beyond the threshold are considered to be out-of-scope augmented 3D models. The determination of the augmented 3D models as either in-scope or out-of-scope may be performed by comparing the target features of the augmented 3D models to the thresholds.

At 610, for each of the augmented 3D models, auxiliary training data is generated utilizing the augmented 3D model. In an example, the augmented 3D models are input into the projection engine which generates a plurality of 2D projections based on the augmented 3D model and based on the projection parameters as described previously with reference to 604. The plurality of 2D projections form the auxiliary input data. The auxiliary labels may be determined by classifying the augmented 3D models from which the auxiliary input data is generated as set out previously such that the auxiliary input data that is generated utilizing in-scope augmented 3D models have an in-scope auxiliary label, and auxiliary input data that is generated utilizing out-of-scope augmented 3D models have an out-of-scope auxiliary label.

At 612, the auxiliary training data comprising the auxiliary input data and the auxiliary labels is utilized to train a machine learning system. In some examples, the auxiliary training data may be supplemented by training data that is collected in a conventional matter. The training process utilizing the auxiliary training data may be performed similarly to the training process described above with reference to FIG. 1.

Although the method of generating auxiliary training data described with reference to FIG. 6 may require a person, for example to generate the specifications and thresholds, the augmentations that are performed by the augmentation engine are performed in the object source space, which is different than the augmentations performed in previously described embodiments which perform augmentation in the input feature space. Performing augmentation in the object source space has a tremendous advantage over the other augmentations performed on the input feature space by bounding the augmentations to those which are feasible in the object source space, which leads to augmentations that are more reflective of what is likely to be seen in a real-life usage scenario and therefore auxiliary training data that is better suited for training a machine learning system.

In an alternative example to the example method illustrated by the flow chart shown in FIG. 6, 2D projections of the one or more 3D models may be generated by the projection engine, similar to the optional step 604 described previously. These 2D projections may then be augmented to generate augmented 2D projections which form the auxiliary input data. Auxiliary labels are then generated for the augmented 2D projections. In one example, the generation of auxiliary labels may be performed by a person who evaluates the auxiliary training data elements and determines if the auxiliary input data elements are in-scope or out-of-scope.

Alternatively, the auxiliary labels for the augmented 2D projections may be generated by a trained machine learning system. For example, the generative model is part of a GAN that includes a discriminator model that is also trained utilizing the initial training data, such as the original 2D projections generated using the one or more 3D models. In this example, the discriminator model may be utilized to generate the auxiliary labels for the auxiliary input data generated by the generative model. A discriminator model is a model in a GAN that may be trained to make a binary prediction regarding whether inputted data is real or fake or a metric that indicates the likelihood that the inputted data is real or fake, which may then be compared to a threshold as described previously.

Furthermore, augmentations performed in the object source space significantly simplifies the process for a human involved in the process in two ways. First, it is typically more natural for people to work in the object source space compared to the input feature space because, in the example of 3D objects, the object source space is the 3D world which is where the object actually exist, whereas the input feature space is an abstract space. Second, each individual augmentation of a specification of a 3D model performed in the object source space translates to a significant number of projections in the input feature space when applying different rotations, colours, textures, and lighting conditions to the augmented 3D, which projections are automatically created by the projection engine.

Figure 7:
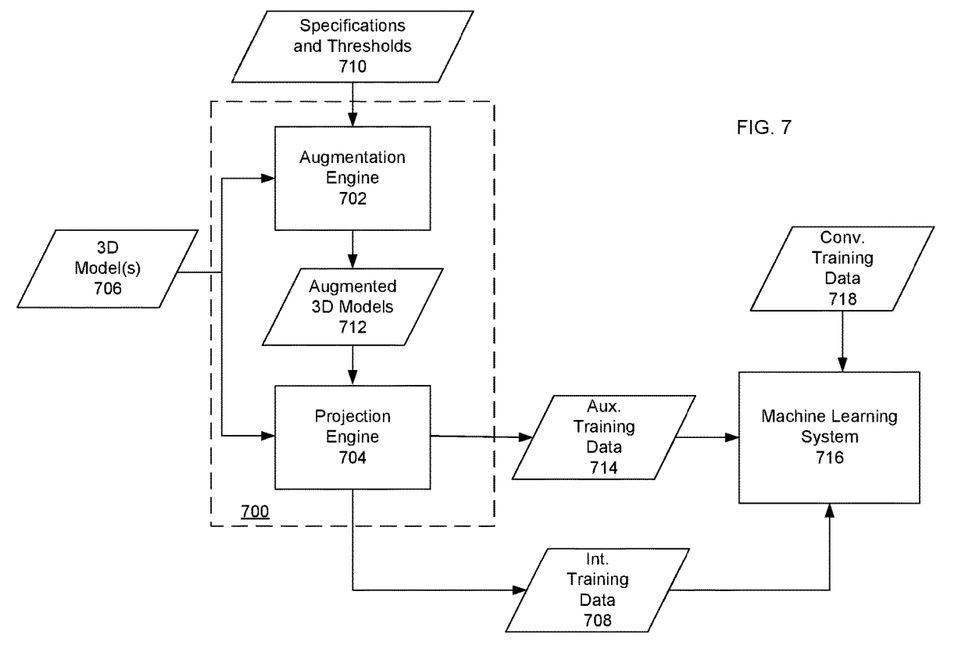
FIG. 7 is a schematic presentation of an example apparatus for generating auxiliary training data according to the method shown in FIG. 6.

Referring now to FIG. 7, an example apparatus 700 that may be utilized to generate auxiliary training data in accordance with the method illustrated by the flow chart shown in FIG. 6 is shown. The apparatus 700 includes an augmentation engine 702 and a projection engine 704. 3D models 706 for the one or more 3D objects forming the system of interest may optionally be input into the projection engine 704, which generates 2D projections that form the initial training data as described previously with reference to 604 of FIG. 6. The 3D models 706 are also input into the augmentation engine 702, together with the specifications and thresholds 710, as previously described with reference to 606 of FIG. 6. The augmentation engine 702 then generates a plurality of augmented 3D models 712 as previously described with reference to 608 of FIG. 6. The augmented 3D models 712 are input into the projection engine 704 to generate the auxiliary training data 714 as described previously with reference to 610 of FIG. 6. The auxiliary training data 714 is then utilized for training that machine learning system as previously described with reference to 612 of FIG. 6. Training the machine learning system 716 with the auxiliary training data 714 may optionally include utilizing the optional initial training data 708, or conventional training data 718 that is collected in a convention manner, or both the initial training data 708 and conventional training data 718.

Embodiments of the present disclosure provide methods and apparatuses for generating auxiliary training data. The auxiliary training data that is generated by embodiments of the present disclosure include input data that are near the true input feature space class boundaries, which reduces the error between the learned and true input feature class boundaries during the training process, which improves the quality of the predictions generated by the trained machine learning system. This error reduction also mitigates against adversarial methods that exploit the error between the learned and true input feature space class boundaries to attack and compromise machine learning systems. By including more training data near the true input feature class boundary compared to training data collected by conventional ways, the auxiliary training data generated by embodiments of the present disclosure reduce the total number of training examples required compared to conventionally collected training data.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for training a machine learning engine configured to determine whether an object in a two dimensional (2D) image is in-scope or out-of-scope relative to the one or more 3D objects, the method comprising:
   receiving a 3D model of each of the one or more 3D objects;
   for each 3D model:
      receiving a set of specifications and thresholds for the 3D model;
      augmenting the specifications of the 3D model to generate a plurality of augmented 3D models; and
      generating auxiliary training data based on the plurality of augmented 3D models; and
   utilizing the auxiliary training data to train the machine learning engine,
   wherein generating auxiliary training data based on the plurality of augmented 3D models comprises, for each augmented 3D model:
      determining whether the specifications of the augmented 3D model are within the thresholds;
      classifying any augmented 3D model that are determined not within the thresholds as out-of-scope; and
      classifying any augmented 3D models are determined to be within the thresholds as in-scope.

2. The method of claim 1, further comprising:
   for each 3D model, generating a plurality of 2D projections of the 3D object associated with the 3D model, the plurality of 2D projections comprising initial training inputs that are each associated with an in-scope label, the 2D projections and in-scope labels comprising initial training data; and
   utilizing the initial training data to train the machine learning engine.

3. The method of claim 1, wherein generating the auxiliary training data based on the plurality of augmented 3D models comprises, for each augmented 3D model:
   generating a plurality of augmented 2D projections of the augmented 3D model, the plurality of augmented 2D projections comprising augmented training inputs that are each associated with an in-scope label when the augmented 3D model is classified as in-scope or an out-of-scope label when the augmented 3D model is classified as out-of-scope.

4. A method for training a machine learning engine comprising:
   receiving sampling parameters related to a system of interest;
   sampling a generative model of a generative adversarial network (GAN) based on the sampling parameters to generate auxiliary input data;
   inputting the auxiliary input data into a discriminator model of the GAN to generate an auxiliary label associated with each of the auxiliary input data element, and
   utilizing the auxiliary input data and auxiliary labels as auxiliary training data to train the machine learning engine.

5. The method of claim 4, further comprising:
   receiving initial training data; and
   utilizing the initial training data to train the generative model and the discriminator model of the GAN system.

6. The method of claim 4, wherein the discriminator model is configured to output a metric based on the auxiliary input models, and generating auxiliary labels associated with the auxiliary input data comprises:
   inputting the auxiliary input data into the discriminator model to generate a metric associated with each of the auxiliary input data element; and
   comparing the metric to one or more thresholds to determine the auxiliary label.

7. The method of claim 4, wherein the system of interest is one or more three dimensional (3D) objects, and the machine learning engine is configured to determine whether an object in a two dimensional (2D) image is in-scope or out-of-scope relative to the one or more 3D objects.

8. The method of claim 7, wherein the auxiliary input data are 2D renderings of the 3D objects, and the auxiliary labels are either in-scope indicating that the 2D rendering corresponds to one of the one or more 3D objects or out-of-scope indicating that the 2D rendering does not correspond to one of the one or more 3D objects.

9. The method of claim 4, further comprising utilizing the auxiliary training data to further train the generative model and the discriminator model of the GAN system.

* * * * *